UNITED STATES PATENT OFFICE.

HAROLD T. MAITLAND, OF MARCUS HOOK, PENNSYLVANIA, ASSIGNOR TO SUN COMPANY, OF PHILADELPHIA, PENNSYLVANIA, A CORPORATION OF NEW JERSEY.

PROCESS OF REFINING LUBRICATING-OILS.

1,188,961.  Specification of Letters Patent.  Patented June 27, 1916.

Application filed August 5, 1915. Serial No. 43,736.

*To all whom it may concern:*

Be it known that I, HAROLD T. MAITLAND, a citizen of the United States, residing at Marcus Hook, county of Delaware, and State of Pennsylvania, have invented a new and useful Improvement in Processes of Refining Lubricating-Oils, of which the following is a full, clear, and exact description.

My invention relates to the refining of lubricating oils and has for its more especial object the production of an oil of a color best adapted for sale as a commercial product.

In the refining of petroleum oil distillates, especially the lighter distillates adapted for illuminating purposes, it is customary to add to the same, sulfuric acid in an amount dependent upon the character of the distillate, thoroughly mix the oil and acid by agitation, and allow the mixture to settle. The result of this treatment is to cause the acid to combine with certain hydrocarbons and other compounds, the removal of which hydrocarbons and other compounds renders the remaining oil of greater purity and better color. The combined acid hydrocarbons and compounds then settle to the bottom of the tank, forming a sludge acid which is drawn off. The oil is then washed with water, which is then allowed to settle and is drawn off, the washing operation being repeated as often as is necessary. An alkali, usually caustic soda, is added to neutralize the acid and thus eliminate it, as fully as possible, from the oil, after which the oil may be again washed by agitating. Alkalis other than caustic soda, have been used, and in the manufacture of illuminating oils and in the treatment of sludge, aqua ammonia and other alkaline substances have been mentioned in prior patents as substitutes for the caustic soda. The sulfuric acid process, followed by treatment with caustic soda, has also been applied to the refining of the heavier distillates and reduced distillates such as those adapted for lubricating purposes. But this treatment, as applied to lubricating oils, has not produced satisfactory results. The oil, after distillation, is much darker in color than the lighter distillates, due to the presence of comparatively large quantities of certain hydrocarbons and compounds which render the oil dark in color. After agitation with acid, the immediate effect of the sulfuric acid and its products of dissociation, chiefly sulfur dioxid ($SO_2$), is to darken the oil.

The darkening at the time of agitation with $H_2SO_4$ is due to the combination of sulfuric acid with certain hydrocarbons and other compounds, forming a finely divided precipitate known in the arts as resins, or sulfonic compounds. Owing to the finely divided condition of these resins it has heretofore been impossible to effect their complete removal by any known method. The usual method is to allow the oil containing these resins to remain in a state of quiescence in a settling container until a large part of the resins has been settled to the bottom of the container, from which they were drawn off by means of a pipe connected to the bottom of said container. The oil was then neutralized with caustic soda or some similar alkali and the process subsequently finished in much the same manner as previously cited in the treatment of the lighter distillates. This process necessitates the consumption of a considerable period of time between that of bringing the acid in contact with the oil and that of the drawing off of the resins before neutralization. During this period the oil is badly damaged in respect to its color by its prolonged standing in intimate contact, first, with that portion of the sulfuric acid which was not utilized in the above mentioned reaction; second, with certain products of dissociation of sulfuric acid; third, with the resins themselves. This process also necessitates the neutralizing of the oil by caustic soda or some other similar alkali while a large amount of the above mentioned resins still remain in the oil. These resins, which are themselves black in color, are redissolved into oil by this treatment, and the oil consequently considerably darkened.

The main object of my invention is to produce a lubricating oil of a lighter, clearer and more highly translucent color, which object I accomplish by preserving to a substantial degree the color that the oil would have if the beneficial effects of the addition of sulfuric acid could be retained without the discoloration which the acid produces during sedimentation and before neutrali-

UNITED STATES PATENT OFFICE.

THOMAS F. MATTHEWS, OF PHILADELPHIA, PENNSYLVANIA.

BOOK-MARKER.

1,188,963.   Specification of Letters Patent.   Patented June 27, 1916.

Application filed September 28, 1915. Serial No. 53,103.

*To all whom it may concern:*

Be it known that I, THOMAS F. MATTHEWS, a citizen of the United States, residing in the city and county of Philadelphia, State of Pennsylvania, have invented a new and useful Book-Marker, of which the following is a specification.

My invention consists of a book marker a portion of which is adapted to be inserted in the channel between the joints or stitching of the leaves and the back-bone of the book, and another portion is adapted to engage the leaves in the front of said joints or stitchings, thus conveniently designating the marked place in the book, and assisting to keep the latter open at said place, while firmly remaining in position on the book.

The invention is satisfactorily illustrated in the accompanying drawing, but the important instrumentalities thereof may be varied, as long as they are included in the scope of the claim.

Figures 1 and 2 represent perspective views of forms of book markers embodying my invention.

Referring to the drawings: 1 designates a fork which is composed of a pair of legs, and the cross bar 10 joining the tops of said legs.

11 designates a disk in which is an opening horizontally and transversely directly therein, the same receiving said cross bar, thus forming the bearings for said disk, permitting it to be placed in either vertical or horizontal position as desired, it being noticed one of the legs may be fitted to the backbone of a book, and the other leg placed between the leaves of the book at a place to be marked. While the disk provides convenient means for handling, applying and removing the marker, it affords also means for placing indicating matter or information thereon for purposes of displaying the same, and when desired said disk may be folded or turned down on the top edges of the book between the covers of the book, whereby it will be practically out of the way when the book is closed.

In Fig. 2, the disk is of the form of an annulus 15, a portion of the periphery of which is cut away as at 16, to receive the upper end portions of the legs which are united by twisting as at 18, the top terminals of the legs being bent laterally forming cross bars 17 which are fitted freely in horizontal openings in the walls of said cut away portions of the disk, forming bearings for the latter, whereby the disk may be placed in vertical, or horizontal positions, as is the book marker described in Fig. 1, while the other leg is reeved through the foldable piece 19 of paper, cardboard or other material which may be placed upon the exposed faces of the leaves and have ornamentation or matter printed on it as desired. The end of the leg in the piece 19 is turned forming the hook 20 which prevents disconnection of the piece from the leg and vice versa. It is evident that the marker may be readily drawn from its position and so removed, it being found that it has in no wise, marred or defaced any portion of the book.

Having thus described my invention what I claim as new and desire to secure by Letters Patent, is:—

In a book marker, a fork composed of a plurality of legs, a cross bar at the top thereof, and a swinging disk on the top having therein a horizontally and transversely-extending opening, said cross bar freely occupying said opening and forming the axis of said disk.

THOMAS F. MATTHEWS.

Witnesses:
JOHN A. WEIDERSHEIM,
N. BUSSINGER.

Copies of this patent may be obtained for five cents each, by addressing the "Commissioner of Patents, Washington, D. C."